Jan. 23, 1968  G. ROUYER ETAL  3,364,710

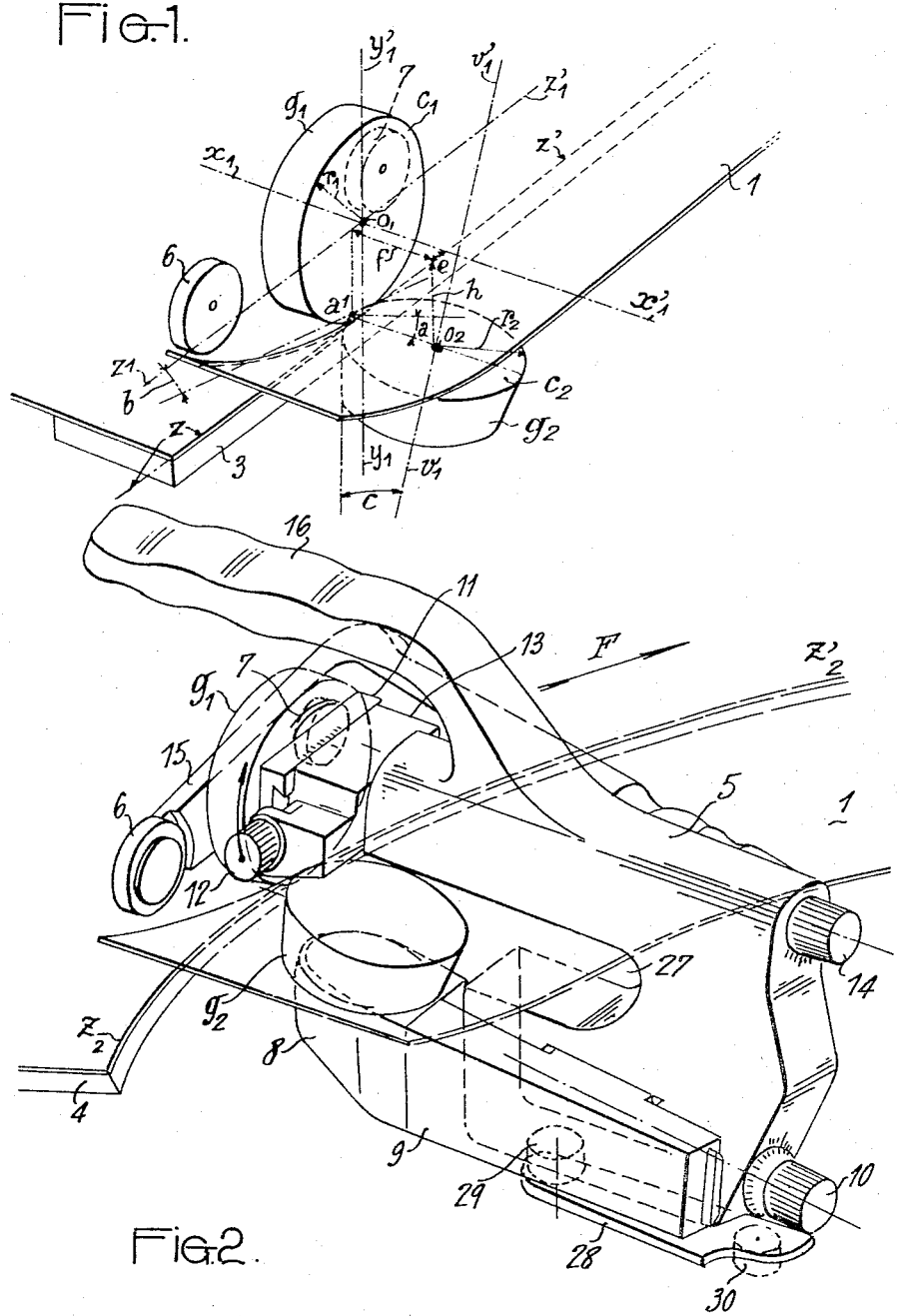

SHAPING TOOL FOR THIN SHEETS

Filed March 15, 1965  3 Sheets-Sheet 2

Inventors
Georges Rouyer
Marcel Duchemin
By
Karl W. Flocks
Attorney

United States Patent Office 3,364,710
Patented Jan. 23, 1968

3,364,710
SHAPING TOOL FOR THIN SHEETS
Georges Rouyer, Paris, and Marcel Duchemin, Colombes, France, assignors to Nord-Aviation Societe Nationale de Constructions Aeronautiques
Filed Mar. 15, 1965, Ser. No. 439,626
Claims priority, application France, Mar. 16, 1964, 967,612
4 Claims. (Cl. 72—71)

ABSTRACT OF THE DISCLOSURE

A shaping and cutting tool using adjustable rollers placed adjacent to each other to cut thin sheets and also to shape them by bending an edge against one roller by the form and placement of the other roller or rollers. In some embodiments rollers are at a right angle, an obtuse, or acute angle to each other and in another embodiment are parallel to each other.

The present invention relates to an apparatus intended for shaping materials having the form of thin sheets and, more precisely, to a shaping apparatus with rollers for shearing and raising the edges, in particular of thin sheets of all metals.

The use of materials in the form of thin sheets has for a long time been general in industry, and especially the use of thin sheets of metal. In certain industries, in particular in the aero-spatial industry, the assemblies produced with thin sheets are of increasingly large dimensions, of more and more complicated shapes, and necessitate a constantly increasing accuracy. The shearing and lifting of the edges of the sheets, in order for example to permit their assembly by electric arc welding with refractory electrodes under an inert gas, sometimes previously worked in order to fit the shape of a given volume, condition the accuracy of the whole assembly.

A known method of shearing and lifting the edges of materials in the form of sheets, and especially of metallic sheets, consists of cutting these sheets or lifting their edges between two rotating rollers, generally of frusto-conical shape with a straight section, the axes of rotation of which are either parallel or not parallel, and in this case in the same or different planes, the working faces of the said rollers being very close to each other or actually in contact at a point on their periphery, the form, the nature and the position of the said rollers depending on the shaping operation to be effected and on the physical and mechanical characteristics of the sheets to be shaped.

Up to the present time, the operations of shaping thin sheets necessitating a high degree of accuracy, in particular in the preparation of welding joints when the defect of junction must not exceed two to three hundredths of a millimetre, were carried out by hand or on complicated and bulky machines designed mainly for shaping sheets of medium thickness, in addition to which it is not always possible on such machines to place sheets of very large dimensions or of very complicated curved shapes.

The present invention has for its particular object to produce:

A tool for shearing and lifting the edges designed for thin sheets, which is portable, can be held by hand, and which can be easily moved along an outline of any kind on the surface of sheets of any size and even of complicated shapes;

A tool for shearing and lifting the edges which is portable and movable along the surface of the sheets to be shaped, applying the known method which consists of cutting a sheet or lifting its edges between two rotating rollers, the said tool enabling a high degree of precision to be obtained in the manufacture of the said sheets;

At least one adjustment device mounted on the shaping tool in order to adjust in an accurate manner the working position of the shaping rollers as a function of the nature of the work to be carried out and also of the physical and mechanical characteristics of the sheet to be shaped;

At least one guiding device mounted on the tool in order to guide the latter in an accurate manner along the desired outline over the sheet to be shaped;

A shaping tool readily handled by a single operator and having simple adjustments so as to permit its use by employees having hardly any specialist training;

Shaping and guiding members which are removable and interchangeable, depending on the nature of the shaping operation and the physical and mechanical characteristics of the sheet to be shaped, so that there is obtained a multi-purpose and especially inexpensive tool;

A tool for shearing and lifting edges intended for shaping thin metallic sheets, especially metal sheets of very high strength, resisting pressures which may exceed 250 hectobars, at the same time being very easily handled and having a high degree of accuracy.

The characteristic features and the advantages of the present invention will become apparent during the course of the detailed description which follows below, with reference to the accompanying diagrammatic drawings, and which gives, purely by way of explanation and not in any limitative sense, various forms of possible embodiment of the invention.

In these drawings:

FIG. 1 shows in perspective the arrangement of the shaping rollers and the guiding of the tool in a first form of embodiment of the invention, employed in a shearing operation.

FIG. 2 shows a view in perspective of the shaping tool in accordance with the first form of embodiment of the invention.

Figures 3, 4:
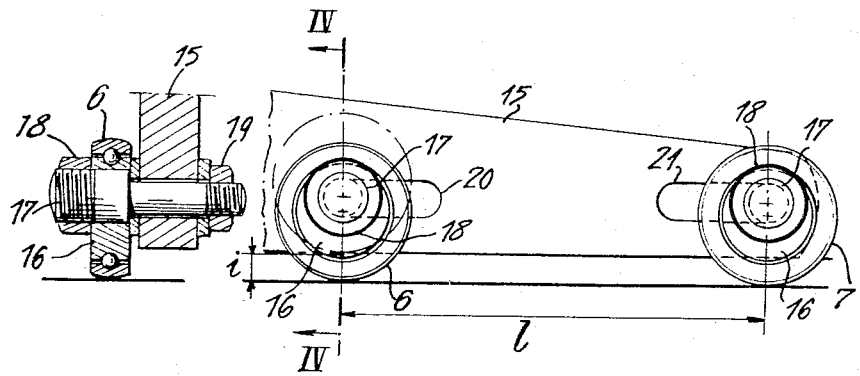
FIG. 3 is a front view of the adjustable rollers of the tool in the first form of embodiment of the invention.
FIG. 4 is a view in cross-section of the same rollers, taken along the line IV—IV of FIG. 3.

In the first form of embodiment of the invention, the axes of the shaping rollers (shearing or lifting the edges) are not parallel. In FIG. 1, the sheet 1 to be shaped is assumed to be flat by way of example, located in a horizontal plane and having to be cut along a straight line $zz'$. The upper shaping roller $g_1$ is a cylindrical shearing roller with a straight section, having a radius $r_1$ rolling on the sheet 1 along the line $zz'$, the cutting face $c_1$ with its center $o_1$ on the roller $g_1$ remaining in the vertical plane passing through $zz'$. The shaping roller $g_2$, mechanically coupled to the roller $g_1$, as will be described in more detail later, is a frusto-conical shearing roller of straight section, of which the face $c_2$ having its centre at $o_2$ and a radius of $r_2$ is supported on the face $c_1$ of the roller $g_1$ at a point $a_1$ located close to or on the periphery of the face $c_1$ the generator lines of the frusto-conical roller $g_2$ forming with its axis $v_1$, $v'_1$ an angle $c$ such that the contact of the face $c_2$ on the face $c_1$ is possible. The roller $g_2$ is supported while rolling at a point of its generator lines on the vertical face of a former 3 in the shape of a parallelepiped rectangle placed under the sheet 1, and of which one edge is parallel to the shearing line $zz'$, the former 3 thus serving as a guide for the roller $g_2$ and in consequence to the roller $g_1$ which is mechanically coupled to it.

With respect to a trihedron of reference with a center $o_1$ coupled to the roller $g_1$, the horizontal axis $x_1-x'_1$ being the axis of the roller $g_1$, the horizontal axis $z_1-z'_1$ being parallel to the direction of shear $zz'$ and the vertical axis $y_1-y'_1$ passing through the point of contact of the face $c_1$ on the sheet 1, the position of the roller $g_2$ is determined on the one hand by the position of the center $o_2$ of the cutting face $c_2$, the center $o_2$ being identified by its co-ordinates $e, h, f$ with respect to the trihedron of reference, and on the other hand by the direction of the axis $v_1-v'_1$ of the roller $g_2$, or if so preferred by the direction of the plane of the face $c_2$, this latter direction being determined by the angle $a$ of the plane of the said face $c_2$ with the axis $x_1-x'_1$ and the angle $b$ of this same face with the axis $z_1-z'_1$.

It is well known that for given radii $r_1$ and $r_2$ of the cutting face and a given angle of the directions of the axes $x_1-x'_1$, $v_1-v'_1$ of the two shaping rollers, that is to say for a given value of the angles $a$ and $b$, the cutting angle of the two shaping rollers, which depends especially on the thickness and the hardness of the sheet to be shaped, is determined by the position of the point of contact $a_1$ of the face $c_2$ on the face $c_1$. In consequence by the position of the center $o_2$ in the vertical plane parallel to the direction of shearing, this position is referenced by the co-ordinates $e$ and $h$ of the said center $o_2$ in this plane.

In this first form of embodiment of the invention, the respective directions of the axes of the rollers $g_1$ and $g_2$ form between them a constant angle. That is to say the angles $a$ and $b$ are given by construction, and the shaping tool comprises, as will be described in more detail below, at least one adjusting member to provide the variations $e$ and $h$ necessary for the adjustment of the cutting angle of the shaping rollers as a function of the physical and mechanical characteristics of the sheet to be shaped. The horizontal plane of reference is constituted by the support on the sheet 1 on the one hand of the upper shaping roller $g_1$, and on the other hand of two additional rollers 6 and 7, adjustable and rigidly fixed to the tool, while the vertical axis is formed by the support of the lower shaping roller on the former 3 which serves as a guide.

It should be noted that the cutting outline may not be straight. In this case, the cutting face $c_1$ remains constantly in the vertical plane tangential to the curve of cut at the point of contact of the said face $c_1$ with the sheet to be shaped and the former 3 on which the lower shaping roller $g_2$ travels and follows the line of the curve of cut.

In the case where the sheet to be shaped is not flat but follows the shape of a volume of any kind, the face $c_1$ of the shaping roller remains constantly in the plane normal to the surface of the sheet to be shaped, tangential to the outline of the cut, at the point of contact of the said face $c_1$ with the sheet to be shaped. The rollers 6 and 7 are regulated in consequence so as to ensure the support of the tool on the said sheet. The former 3 then follows the shape of the sheet and its lateral face serving as a guide for the lower shaping roller $g_2$, and is parallel to the said outline of cut.

FIG. 2 shows a perspective view of the shaping tool according to the first form of embodiment of the invention, corresponding to the arrangement of the shaping rollers shown in FIG. 1 and previously described. The shaping tool effects a cutting operation along an outline $z_2z'_2$ assumed by way of example to be non-rectilinear, of a sheet 1 resting on a former 4 of straight rectangular section and of incurved shape following the outline $z_2z'_2$.

The two shaping rollers $g_1$ and $g_2$ between which the sheet 1 is cut, are mounted by means of adjustment devices on the body 5 of the tool, the shape of which enables it to be held at various points, in particular by a handle 16, the axis of which may be parallel to the axis of the upper roller $g_1$. The body of the tool further comprises a recess 27 for the passage of the cut-off portion of the sheet 1 to be shaped.

The adjusting device on which the other shaping roller $g_1$ is mounted permits the movement of this roller in a plane perpendicular to its axis; it may be constituted for example by a rotating unit 13 rotating about a shaft fixed to the body 5 of the tool and parallel to the shaft of the roller $g_1$, this shaft being rotable through the desired angle by a micrometer knob 14 and a slide 11, mounted in turn on the said unit 13 and movable by means of a micrometer screw (not shown) fixed to the unit 13 and actuated by the knob 12 in a direction perpendicular to the axis of the said roller $g_1$.

The lower shaping roller $g_2$ is mounted on a support 8 incorporated in a slide 9 movable in a fixed direction by means of a micrometer screw (not shown), fixed to the body 5 of the tool and actuated by a micrometer knob 10, the shape of the support 8 being such that the directions of the axes of the rollers $g_1$ and $g_2$ form the desired angle of construction. The adjusting devices of the rollers $g_1$ and $g_2$, and in particular the direction of lateral movement of the slide 9 are such that, irrespective of these adjustments, the cutting faces of the said shaping rollers can always be brought into contact or as close to each other as may be desired, at a point on their periphery or in proximity thereto.

It is clear that with the said adjusting device of the lower shaping roller $g_2$, the distance $f$, shown in FIG. 1, from the center of the cutting face of the roller $g_2$ to the cutting face of the upper roller $g_1$, can be varied to the desired extent, while with the said adjusting device of the upper roller $g_1$, the position of the center of the cutting face of the lower roller $g_2$ with respect to the center of the cutting face of the upper roller $g_1$ can also be varied as desired, and in a plane parallel to the said cutting face of the roller $g_1$. That is to say the distances $e$ and $h$ shown in FIG. 1 can be given the desired value and thus the value can be determined of the cutting angle of the two shaping rollers.

The support and rolling of the shaping tool according to the invention on the sheet 1 are ensured by the roller $g_1$ and by the two adjustable rollers 6 and 7; the rollers 6 and 7, the rolling face of which is cambered so as to permit the rolling of the tool, especially over sheets to be shaped which do not have a flat form, are mounted on an arm 15 fixed to the body of the tool in such manner that their rolling axes are parallel to the axis of the upper shaping roller $g_1$. In the preferred form of embodiment of the invention the rollers 6 and 7 are identical and are located on the same plane perpendicular to the axis of the roller $g_1$; the position of the rollers 6 and 7 in their plane can be adjusted by devices described in detail later, on the one hand to compensate for the vertical movement of the shaping roller $g_1$ during the adjustment of the cutting angle of the rollers $g_1$ and $g_2$, and on the other hand to ensure the support of the shaping tool on the sheet to be shaped when the latter has a form which is not flat, and finally to ensure easy guiding of the tool in the cases where the cutting-out lines comprise at certain points radii of curvature which are particularly small.

The shaping tool according to FIG. 2 operates in the following manner:

The operator having adjusted the contact of the rollers $g_1$ and $g_2$, and also the cutting angle of these rollers by means of the knobs 10, 12 and 14, and having verified the support of the tool on the sheet 1 to be shaped by regulating the position of the rollers 6 and 7, grips the body 5 of the tool with one hand and the handle 16 with the other, and gives it the movement indicated by the arrow F, taking care to apply the lower roller $g_2$ against the former 4 fixed rigidly to the sheet 1, and by directing the tool in such manner that the cutting face of the roller $g_1$ remains tangential to the outline to be cut. The placing in position of the shaping tool according to the invention in the middle of a sheet is always possible by momentarily separating the shaping rollers $g_1$ and $g_2$ and pivoting the unit 13 in such manner that the axis of the knob 12, that is to say the axis of the slide 11 is vertical, the bringing together of the shaping rollers taking place at the desired position.

In the case of a circular curve $z_2z'_2$, there may be provided as an alternative for the guiding of the tool according to the invention, an articulation 28 of which one extremity is connected to a fixed point on the body of the tool through the intermediary for example of a shaft 29 perpendicular to the plane of the circle $z_2z'_2$ and being freely incorporated in the body 5 of the tool, the other extremity being connected to a fixed point through the intermediary, for example, of a further shaft 30 also perpendicular to the plane $z_2z'_2$.

FIGS. 3 and 4 illustrate in plan and in cross-section the devices given by way of example for adjusting the positions of the rollers 6 and 7 in their common plane.

Each roller 6 and 7 is mounted on a core 16 rotating about a shaft 17 eccentric with respect to the axis of the said rollers and parallel to the said axis, the eccentric shafts being housed in the arm 15 rigidly fixed to the body of the tool and comprising, on the side of the rollers 6 and 7, a clamping nut 18 for locking the cores 16 and therefore the shafts of the said rollers in the desired position. The eccentric mountings cause the positions of the axes of the rolling rollers to vary in a plane parallel to that of the face of the roller $g_1$ having a maximum height $i$ and thus enabling the movements of the said roller $g_1$ in its plane to be taken-up, or to adapt the support of the shaping tool on a sheet having the form of a volume of any kind, such as, for example, a cylinder or a sphere.

In addition, there may be formed in the arm 15 fixed to the body of the tool, mortices 20 and 21 located in the same horizontal plane, the eccentric shafts 17 sliding in the said mortices and comprising at their extremities clamping nuts 19 which lock the devices on which the rollers 6 and 7 are mounted in the desired position. In this way it is possible to reduce the distance $l$ between the axes of the rollers 6 and 7 in order to ensure easy guiding of the shaping tool in the cases where the shaping outlines comprise at certain points radii of curvature which are particularly small.

As an alternative to this first form of embodiment of the invention, the shaping rollers $g_1$ and $g_2$ are replaced by rollers of the same shape, but in which the edges of the cutting faces, instead of forming a sharp angle with the generator lines of the said rollers are slightly rounded. The said shaping rollers then serve for operations of lifting the edges of thin sheets, the folding angle being a right angle.

The shaping tool in accordance with the said alternative then operates as the tool shown in FIG. 2 and previously described; however, the distance from the center of the cutting face of the lower shaping roller to the cutting face of the upper shaping roller is adjusted by means of the slide 9 of FIG. 2, in such manner that the shaping rollers are no longer in contact but at a certain distance apart corresponding substantially to the thickness of the sheet to be shaped, the position of the center of the cutting face of the said lower roller in the plane parallel to the face of the upper shaping roller, depending on the height of the edge of the sheet to be shaped, together with the physical and mechanical characteristics of this latter. This position is adjusted as before by the movement of the upper roller in its plane by means of the knobs 12 and 14 of FIG. 2.

Figure 5:
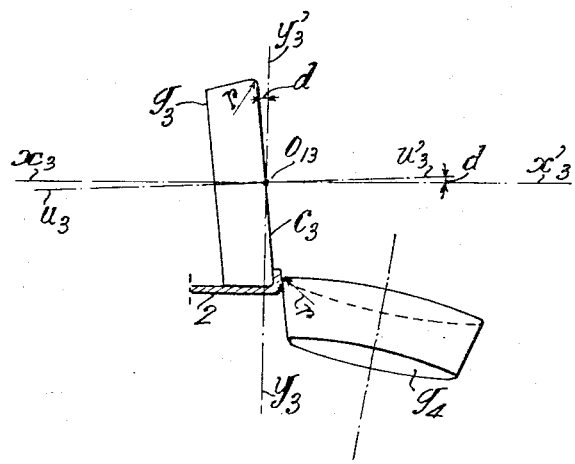
FIG. 5 is a front view of the arrangement of the shaping rollers provided on the tool in accordance with the first form of embodiment of the invention, in an operation of lifting the edges, the angle of folding being an acute angle.

FIG. 5 shows by way of example the position of the shaping rollers in the case of edge lifting, the bending angle being an acute angle instead of being a right angle. The upper shaping roller, instead of being cylindrical is a frusto-conical roller $g_3$ with a straight section, the edge of which rounded to a radius of curvature $r$, supported along one of its generator lines on the sheet 2 to be shaped, which is assumed to be horizontal; the cutting face $c_3$ with its centre $o_3$ of the roller $g_3$ is no longer vertical but forms a small angle $d$ with the vertical axis $y_3$–$y'_3$ which is also complementary to the folding angle of the edge of the sheet, and equal to the angle of the axis $u_3$–$u'_3$ of the roller $g_3$ with the horizontal axis $x_3$–$x'_3$.

The lower shaping roller $g_4$, the edge of which is also rounded to the radius $r$ applies the edge of the sheet 2 to be lifted against the face $c_3$ of the upper roller $g_3$.

The adjustments of the shaping tool are carried out as in the case previously described for lifting edges with a right angle of folding; however, the rollers 6 and 7 of the previously described FIGURE 2 are adjusted in such manner that the frusto-conical roller $g_3$ is applied against the sheet 2 to be shaped along one of its generator lines. The whole of the tool is thus subjected to a rotation through the angle $d$ about a horizontal axis perpendicular to the plane $x_3x'_3$, $y_3y'_3$.

Also by way of an alternative, it is possible to mount on the slide 11 of the previously described FIG. 2, a mechanical device coupling the roller $g_3$ with the said slide for the pivotal movement of the said roller $g_3$ by the angle $d$ about an axis perpendicular to that of the said roller $g_3$, the shaping tool in this case not being subjected to the rotation $d$ which is only applied to the upper shaping roller.

There can also be effected an edge lifting operation when the folding angle is an obtuse angle by replacing in an alternative, the roller $g_3$ by a frusto-conical shaping roller with a rounded edge such that the cutting edge of the said roller forms the desired obtuse angle with its generator lines.

Figure 6:
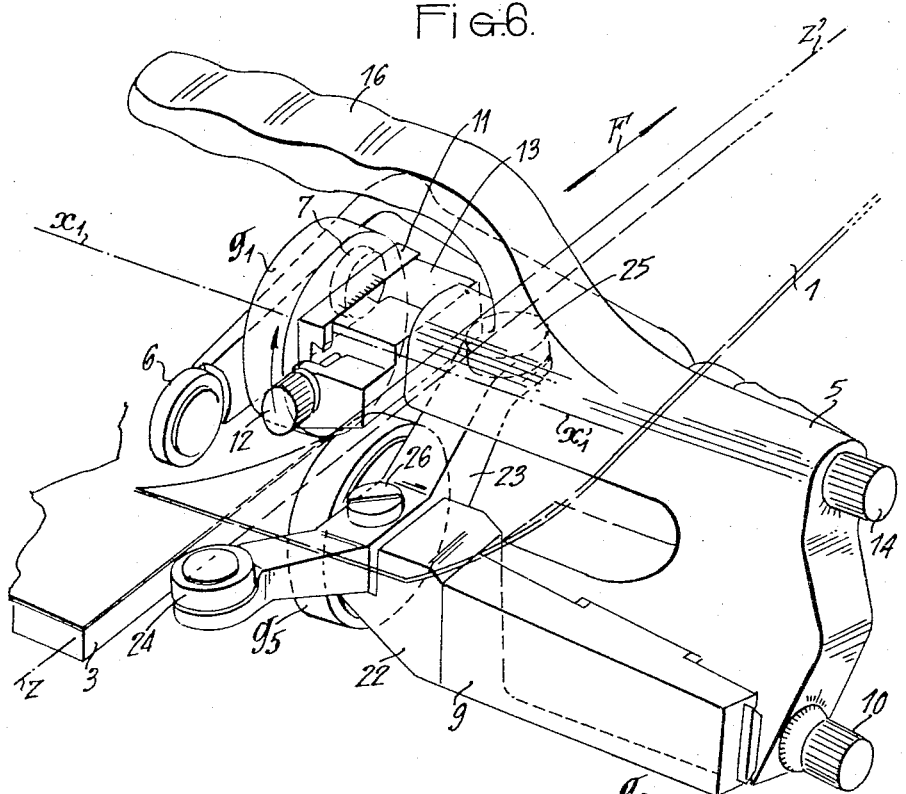
FIG. 6 shows a perspective view of the shaping tool in a shearing operation, following a second form of embodiment of the invention.

FIG. 6 shows the shaping tool in a second form of embodiment of the invention, the shaping rollers having their axis and therefore their working faces parallel. The sheet 1 to be shaped is located by way of example in the horizontal plane and is to be cut along a straight line $zz'$, a parallelepiped rectangular former 3 being placed under the sheet 1, with one of the edges of the former 3 being furthermore parallel to the $zz'$.

The upper shaping roller $g_1$ cylindrical with a straight section, rolls over the sheet 1 along $zz'$, its cutting face being always in the vertical plane passing through $zz'$. The lower shaping roller $g_5$ is cylindrical or frusto-conical with straight section, its axis being parallel to that of the shaping roller $g_1$, and the cutting faces of the said shaping rollers being very close to each other, overlapping each other slightly at a point close to their periphery.

It is well known that, when cutting between rollers with parallel cutting faces, for given radii of rollers, the cutting angle of the said rollers, which depends on the physical and mechanical characteristics of the sheet to be cut, and in particular on its thickness and hardness, is determined by the relative positions of the centers of the cutting faces of the said rollers. That is to say the cutting angle is determined by the distances from the center of the cutting face of the lower roller to the vertical and horizontal planes passing through the axis of the upper roller.

The shaping tool in accordance with this second form of embodiment and shown in FIG. 6, is identical with that of the first form of embodiment shown in FIG. 2 and previously described, except with regard to the lower shaping roller and its support. In the case of FIG. 6 in fact, the lower shaping roller $g_5$ is mounted on a support 22 which is housed in the slide 9 instead of the support 8 of FIG. 2.

The form of the support 22 is such that the axis of the roller $g_5$ is parallel to that of the upper shaping roller $g_1$. The roller $g_5$ is no longer supported on the lateral face of the former 3 and the guiding of the shaping tool in this second form of embodiment of the invention is then effected by two guiding rollers 24 and 25 which are identical and have their vertical axes located in a plane parallel to the face of the shaping roller $g_5$.

The rollers 24 and 25 roll on the lateral face of the former 3 and are mounted on each side of the roller $g_5$, on a support 23 which is mounted in turn on the support 22 by means of a locking screw 26 with a vertical axis. Through the intermediary of the screw 26, the support 23 can be rotated through a small angle and then locked in a position such that the vertical plane of the axes of the guiding rollers 24 and 25 is no longer parallel to the face of the roller $g_5$ but forms a small angle with it so that when the rollers 24 and 25 are supported on the former 3, the whole of the tool is given a slight rotation about a vertical axis, and so that the shaping rollers $g_1$ and $g_5$ form a small displacement angle with the outline of cut $zz'$; this slight displacement may be favourable in certain cases to the cutting of the sheet to be shaped.

It is clear that a shaping tool in accordance with the second form of embodiment of the invention permits of all the adjustments necessary for the determination of the cutting angle of the shearing rollers. The slide 9 operated by the knob 10 ensures the contact of the cutting faces, while the desired relative positions of the center of these cutting faces is obtained by the adjustment of the knobs 12 and 14, which operate respectively the slide 11 and the rotating unit 13. The adjustment of the rollers 6 and 7 takes up the vertical displacement of the roller $g_1$ and thus ensures the correct support of the shaping tool on the sheet 1.

The operation of the shaping tool in this second form of embodiment of the invention is identical with that of the tool in the first form of embodiment, the operator pressing the guiding rollers 24 and 25 on the lateral face of the former 3. This form of embodiment is particularly advantageous when the cutting-out line is straight or, if the sheet to be shaped follows the form of a volume of any kind, in the case where the cutting-out line is located in a plane parallel to the plane of the axes of the guiding rollers 24 and 25.

By way of an alternative to this second form of embodiment of the invention, the shaping rollers intended for cutting can be replaced by shaping rollers intended for lifting the edges of sheets, the latter rollers having their working edges rounded. The adjustment of the shaping tool with this alternative form of the invention being effected in the same way as for a cutting operation, the faces of the parallel shaping rollers not being in contact but at a certain distance, depending on the thickness of the sheet to be shaped and the relative positions of the centers of the said faces being a function on the one hand of the height and of the edge of the sheet and on the other hand of the physical and mechanical characteristics of the said sheet.

As in the case of a shaping tool according to the invention in which the axes of the shaping rollers are not parallel, it is also possible to effect edge-lifting operations with an acute or obtuse bending angle with a tool having shaping rollers with parallel axes, by replacing the upper cylindrical shaping roller by an appropriate frusto-conical shaping roller with a rounded edge, supported on the sheet to be shaped along one of its generator lines. The whole tool is given a slight rotation about a horizontal axis perpendicular to the vertical plane passing through the axis of the upper shaping roller and the rollers mounted on the arm fixed to the body of the tool are adjusted so as to ensure its correct support on the sheet to be shaped.

In an alternative form, the various shaping rollers, whether they are for cutting or for edge-lifting with a bending angle as a right angle acute or obtuse angle, are mounted in a removable manner on the various adjusting devices or intermediate support and in particular the supports of the lower shaping roller housed in the corresponding slide of the body of the shaping tool in the various forms of embodiment of the invention are such that it is possible to substitute one support for another on the same tool body. Thus the same shaping tool can be utilized, after mounting the appropriate rollers in position, indifferently according to the various forms of embodiment of the invention described up to this point, that is to say, with shaping rollers having parallel axes or on the contrary non-parallel axes, and equally well for cutting operations as well as edge-lifting operations with a bending angle being a right angle, acute or obtuse angle. The shaping tool of the present invention is thus particularly inexpensive.

Figure 7:
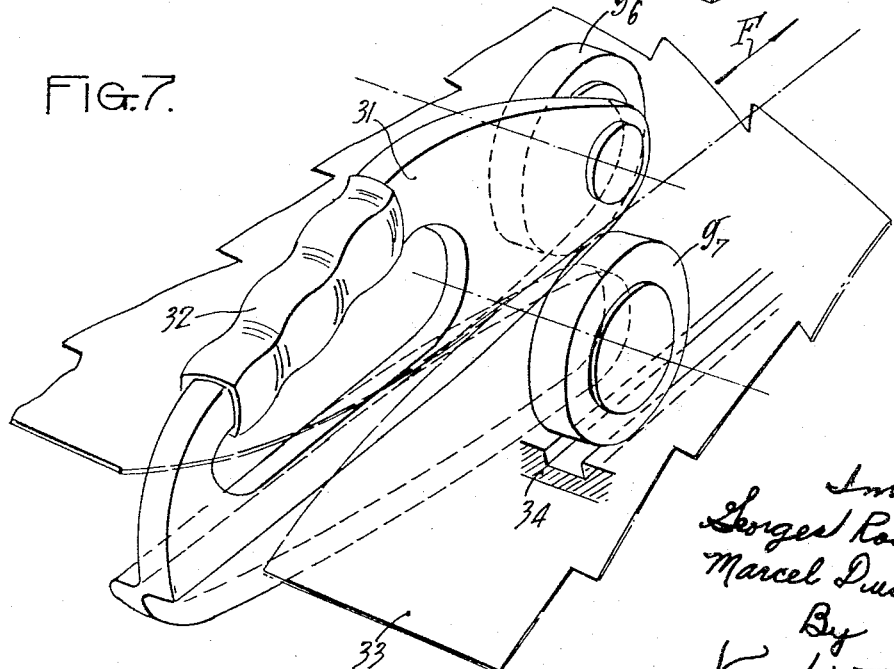
FIG. 7 shows a perspective view of the shaping tool for cutting sheets, the edges of which are very far away, following a third form of embodiment of the invention.

FIG. 7 shows a form of embodiment of the invention for cutting thin sheets, the edges of which are far away from the outline of cut. The cutting tool according to this form of embodiment comprises two rotating cylindrical rollers with straight sections and parallel axes, in which the cutting faces are very close to each other and slightly overlapped at one point on their periphery. The said rotating rollers are mounted directly on the body 31 of the tool in the form of scissors of which each of the arms perpendicular to the axes of the rollers carries one of the said rollers, the arm carrying the upper roller also forming a handle, as shown at 32, for handling the tool thus constituted.

The shape of the body of the tool is such that the cuts of the sheet 33 to be cut are placed naturally on each side of the body of the tool 31. The lower cutting roller may, in an alternative form, be housed in a guide 34 ensuring the guiding of the tool pushed by the operator in the direction of the arrow F.

The present invention is not limited to the forms of embodiment described and shown by way of example, and it can be modified without departing from the scope of the invention. In particular, the movement of the shaping tool can be effected mechanically instead of being carried out manually; there may be added to the tool a curve-detecting device. There may be added complementary guiding rollers rigidly fixed to the tool and supported on appropriate guides fixed or not fixed to the sheet to be shaped. The adjusting devices of the various shaping, guiding and running rollers can be replaced by devices resulting in equivalent adjustments. In particular, one of the shaping rollers may be directly mounted on the body of the tool, the other roller being mounted on an adjusting device permitting the whole of the adjustments determining the relative positions of the two shaping rollers.

There may also be provided additional adjusting devices permitting for example the varying of the direction of the axes of the shaping rollers. The various shaping, guiding and running rollers removably mounted on their support may be replaced by rollers of different radii, forms or structure.

The arm fixed to the body of the tool and supporting the running rollers can be removable and may be replaced by an arm of a different shape, as a function of the non-planar geometric shape followed by the sheet to be shaped The body of the tool, the various shaping, running or guiding rollers and the adjusting devices can be made as desired of various materials such as synthetic metals or materials; the shapes and the dimensions of the tool and of its various parts, in particular of its shaping rollers can be varied in order to adapt them to the nature of the thin sheets to be shaped, and the latter can be thin sheets of all metals or of natural or synthetic materials of any kind, such as plastic materials or cardboard.

We claim:

1. A portable tool for the manufacture of parts of complex shapes from thin sheets, especially for cutting and edging thin metallic sheets with a view to their subsequent welding, said tool comprising:

a body constituted by upper and lower arms extending in a common general direction having a recess formed between said arms of said body to permit the passage of the sheet to be prepared between said upper arm and said lower arm;

a rotatable roller having a straight section forming an upper shaping roller, said upper shaping roller having a working face, a working edge on said face, and a surface constituted by the generator lines of a body of revolution;

a mechanical coupling device between said upper rotatable roller and said upper arm of said body;

a second rotatable roller having a straight section forming a lower shaping roller, said lower shaping roller having a working face, a working edge on said face, and a surface constituted by the generator lines of a body of revolution;

a second mechanical coupling device between said lower rotatable roller and said lower arm of said body;

an adjusting device connected to at least one of said rotatable rollers permitting the position of at least one of said rotatable rollers to be displaced with respect to the other of said rotatable rollers;

each of said rollers being mounted at one extremity of one of each of said arms of said body of said tool, the directions of the axes of revolution of said rollers forming between them an angle of less than 180° which is always constant;

one of said rollers being cylindrical and the other frusto-conical, their working faces being adjacent to each other;

said adjusting device comprising:
   a movable unit adapted to turn on one of said arms of said body of said tool;
   a slide mounted on said movable unit, said slide moving in a plane perpendicular to the axis of said movable unit;
said rotatable roller being mounted on said slide, and the axis of rotation of said roller being parallel to the axis of rotation of said movable unit.

2. A portable tool for the manufacture of parts of complex shapes from thin sheets, especially for cutting and edging thin metallic sheets with a view to their subsequent welding, said tool comprising:

a body constituted by upper and lower arms extending in a common general direction having a recess formed between said arms of said body to permit the passage of the sheet to be prepared between said upper arm and said lower arm;

a rotatable roller having a straight section forming an upper shaping roller, said upper shaping roller having a working face, a working edge on said face, and a surface constituted by the generator lines of a body of revolution;

a mechanical coupling device between said upper rotatable roller and said upper arm of said body;

a second rotatable roller having a straight section forming a lower shaping roller, said lower shaping roller having a working face, a working edge on said face, and a surface constituted by the generator lines of a body of revolution;

a second mechanical coupling device between said lower rotatable roller and said lower arm of said body;

an adjusting device connected to at least one of said rotatable rollers permitting the position of at least one of said rotatable rollers to be displaced with respect to the other of said rotatable rollers;

each of said rollers being mounted at one extremity of one of each of said arms of said body of said tool, the directions of the axes of revolution of said rollers forming between them an angle of less than 180° which is always constant;

one of said rollers being cylindrical and the other frusto-conical, their working faces being adjacent to each other;

a support rigidly fixed to the body of said tool;

at least two adjustable running rollers mounted on said support to ensure, in addition to said upper shaping roller, the support and the rolling action of said tool on the sheet to be worked;

said running rollers being mounted on said support and having their axes substantially parallel to the general plane of the sheet to be worked.

3. A portable tool for the manufacture of parts of complex shapes from thin sheets, especially for cutting and edging thin metallic sheets with a view to their subsequent welding, said tool comprising:

a body constituted by upper and lower arms extending in a common general direction having a recess formed between said arms of said body to permit the passage of the sheet to be prepared between said upper arm and said lower arm;

a rotatable roller having a straight section forming an upper shaping roller, said upper shaping roller having a working face, a working edge on said face, and a surface constituted by the generator lines of a body of revolution;

a mechanical coupling device between said upper rotatable roller and said upper arm of said body;

a second rotatable roller having a straight section forming a lower shaping roller, said lower shaping roller having a working face, a working edge on said face, and a surface constituted by the generator lines of a body of revolution;

a second mechanical coupling device between said lower rotatable roller and said lower arm of said body;

an adjusting device connected to at least one of said rotatable rollers permitting the position of at least one of said rotatable rollers to be displaced with respect to the other of said rotatable rollers;

each of said rollers being mounted at one extremity of one of each of said arms of said body of said tool, the directions of the axes of revolution of said rollers forming between them an angle of less than 180° which is always constant;

one of said rollers being cylindrical and the other frusto-conical, their working faces being adjacent to each other;

a rolling guide-former means to permit the tool to be constrained to follow a path in accordance with a predetermined outline, said lower roller following said guide-former means.

4. A portable tool as claimed in claim 3 and further comprising:

a support rigidly fixed to the body of said tool;

at least two guiding rollers mounted on said support and having their axes substantially perpendicular to the general plane of the zone of the sheet to be prepared, said guiding rollers on the lateral face of said former means;

and an adjustment means to permit a slight angular displacement of the position of said support about an aixs.

References Cited

UNITED STATES PATENTS

| | | | |
|---|---|---|---|
| 984,575 | 2/1911 | Lennox | 83—496 X |
| 1,383,618 | 7/1921 | Gray | 83—496 X |
| 1,561,803 | 11/1925 | Smith | 83—472 X |
| 1,656,323 | 1/1928 | Gray | 83—496 X |
| 1,720,305 | 7/1929 | Tjernlund | 30—265 |

CHARLES W. LANHAM, *Primary Examiner.*

K. C. DECKER, *Assistant Examiner.*